Nov. 28, 1933.　　　J. F. STANDISH　　　1,936,920
CUTTER GRINDING MACHINE
Filed Jan. 16, 1933
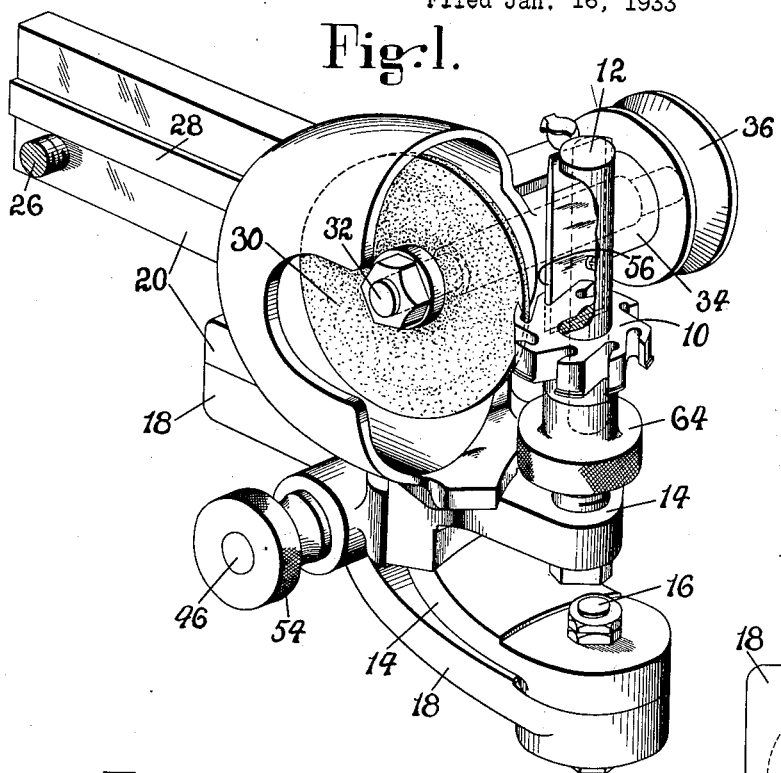
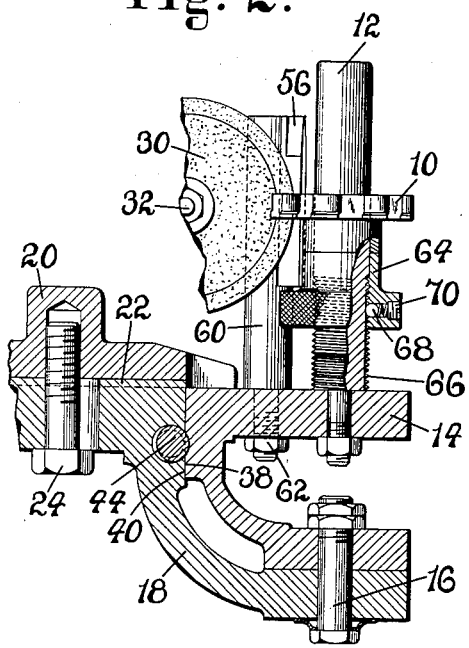
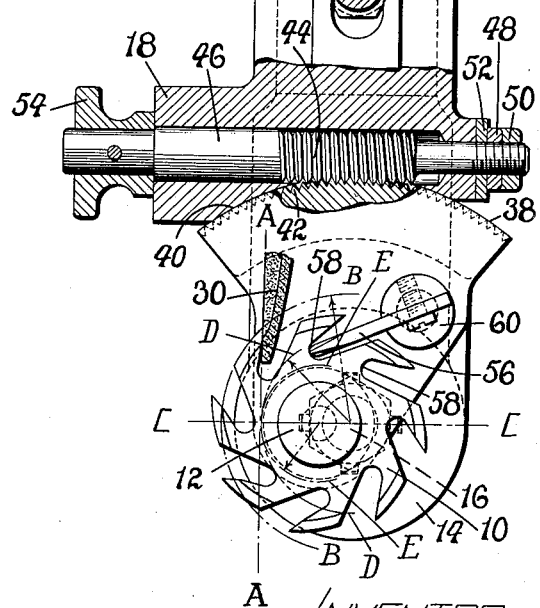
INVENTOR
John F. Standish,
By his Attorney
Harlow D. Davis Patented Nov. 28, 1933

1,936,920

UNITED STATES PATENT OFFICE 1,936,920

CUTTER GRINDING MACHINE

John F. Standish, Winthrop, Mass., assignor to United Shoe Machinery Corporation, Paterson, N. J., a corporation of New Jersey Application January 16, 1933, Serial No. 651,958

9 Claims. (Cl. 51—225)

This invention relates to a grinding apparatus and particularly to one adapted for sharpening rotary toothed cutters of the general type employed for trimming the edges of shoe soles.

It is an object of the invention to provide a machine in which cutters of the above-mentioned type may be positioned conveniently for grinding the front faces of their teeth and in which they may be fed against the wheel with assurance that, as the teeth are ground away by successive sharpening operations, the shape of the teeth will be substantially unchanged until they have been ground away to the limit of their usefulness.

With the above object in view, a feature of the invention consists in a movable carriage for supporting and locating the spindle upon which a cutter is positioned for grinding, the carriage being mounted to turn on an axis which coincides with the center of curvature of the arc of the clearance face of the tooth being ground or, in other words, about the center around which that tooth was "backed-off".

Another feature of the invention consists in locating the axis of the carriage and the center of the cutter spindle in a plane substantially perpendicular to the grinding plane of the wheel. With the parts thus located, and with the axis and center of curvature coinciding as previously described, turning of the carriage about its axis or pivot to feed the cutter toward the wheel, for successive grindings, prevents any substantial change in the shape of the teeth during the useful life of the cutter.

A further feature of the invention consists in mounting a stop, against which the cutter is turned and pressed by hand as it is ground, on the carriage so that it moves therewith. Thus, after the carriage has been positioned for grinding one tooth of a cutter, all of the remaining teeth may be ground to an equal extent and at the same angle without re-adjusting the position of the carriage. Furthermore, after an original adjustment of the stop has been made so that the cutter spindle will be substantially in the plane referred to above, no adjustment of the stop is necessary when the carriage is adjusted for successive grindings as the teeth become dull, unless a cutter of a different style and number of teeth is to be ground.

Other features of the invention consist of arcuate bearing surfaces concentric with the pivot of the carriage, and located on the carriage and on its support, which surfaces assist the carriage pivot in holding the carriage in position against vibration and in worm teeth formed in the arcuate bearing surfaces of the carriage, which teeth are engaged by a longitudinally fixed worm in the support for the carriage. Thus, by turning a nurled head secured to the worm, the carriage may be conveniently moved about its pivot, to advance the cutter in the arc of the clearance face of the tooth to be ground, into proper position for grinding the front face of that tooth.

Another feature of the invention consists in an improved and conveniently operated stop to prevent sliding the cutter beyond that plane, perpendicular to the cutter spindle, which passes through the axis of the grinding wheel. As illustrated, this plane is horizontal and, accordingly, the stop is located to prevent sliding the cutter below the level of the axis of the wheel because, if this is not prevented, the grinding wheel is liable to nick the corners of the teeth and possibly become injured itself. This improved stop is in the form of a thumb-nut that is normally prevented from turning by a friction device consisting of a spring pressed ball which may enter one of one or more longitudinal grooves in the cutter spindle. This construction prevents the thumb-nut from moving accidentally, due to vibration, or any other cause, but permits ready adjustment when necessary.

The invention will be understood when the following specification is considered in connection with the appended drawing, in which, Fig. 1 is a perspective view of the improved grinding apparatus;

Fig. 2 is a side elevation of the apparatus partly in section; and

Fig. 3 is a top view of the apparatus with a portion shown in section.

Referring to the drawing, the cutter to be ground is indicated by the reference numeral 10. It is shown located, ready for grinding, on a cutter spindle 12, the diameter of which is such that there is a sliding fit between the spindle and the center bore of the cutter. This cutter spindle 12 is bolted in an upright position to a carriage 14, which is mounted to swing about a pivot bolt 16. The pivot bolt 16 rotatively secures the carriage 14 to a supporting member 18 which is mounted for longitudinal adjustment on a bracket 20. For this purpose, the support-member 18 is provided with a tongue 22 which engages a corresponding groove in the bracket 20, the parts being clamped together in adjusted position by a clamping screw 24. This adjustment furnishes a means for moving the cutter toward and from the grinding wheel, according to the diameter of the wheel as it wears.

The bracket 20 is bolted to the frame of the machine in which the cutters are utilized, in a position where it will not interfere with the use of the machine in trimming heels but where the cutters may be conveniently sharpened by the operator of the machine. One of the bolts by which the bracket is secured to the machine is shown at 26, a positioning tongue 28 being formed on the side of the bracket 20, for engagement with a corresponding groove on the machine in order to provide a rigid mounting of the bracket on the machine. A dished grinding wheel 30, of the usual type for grinding cutters of the kind referred to, is used, and this wheel is mounted on a shaft 32 supported in a bearing 34 formed on the bracket 20. At the opposite end of the shaft 32 is a grooved pulley 36 by which the grinding wheel is driven from a belt in the usual manner.

In order to support the carriage against vibration in any adjusted position, it has an arcuate bearing surface 38, which cooperates with a complemental bearing surface 40 on the supporting member 18. In order that the carriage may be turned about its pivot 16, to bring a cutter located on the cutter spindle 12 into grinding position, the bearing surface 38 is provided with worm teeth 42, which teeth are engaged by a worm 44 cut on a shaft 46. The shaft 46 is mounted against axial or longitudinal movement in the supporting member 18 by means of a nut 48 and check nut 50 which hold a friction washer 52 in position on one end of the shaft and by a nurled thumb knob 54 pinned to the other end of the shaft 46. In this manner the carriage 14 may be adjusted micrometrically about the pivot 16 to position the cutter spindle 12 and will remain in adjusted position without supplementary locking means during the grinding of all of the teeth of a cutter mounted on the spindle to a predetermined extent, as hereinafter described.

Referring particularly to Fig. 3 and in accordance with the invention, the cutter spindle 12 is secured in such a location on the carriage 14 that, when any one of the teeth of a cutter is brought into grinding position by turning the carriage about its axis, by means of the nurled thumb knob 54, the spindle 12 is so located that the center of curvature of the peripheral, or "backed-off", face of that tooth, (or the center of the arc B—B), is coincident with the center of the pivot 16 about which the carriage is turned by the knob 54. Furthermore, in order to prevent, as much as possible, any change in the angles between the faces of the cutter due to successive grindings during the useful life of a cutter, with a consequent change in its cutting qualities, the axis of the cutter spindle 12 and the axis of the pivot 16 of the carriage are both located substantially in a plane C—C which is perpendicular to the grinding plane A—A of the grinding wheel. By this arrangement, the grinding plane A—A of the grinding wheel is substantially tangent, during the useful life of the cutter, to two arcs, one being the arc E—E drawn about the center of the spindle 12 and the other being the arc D—D drawn about the pivot 16 of the carriage. By turning the carriage 14 about its pivot 16, (or about the center of curvature of the peripheral clearance face of the tooth being ground), the tooth being ground is advanced in its arc of curvature toward the grinding wheel until ground sufficiently. It should be understood that, when the above adjustment is made, that the cutter is fixed, relatively to the carriage, by a stop and that, afterward, each tooth is brought, in succession, into this position and ground to a predetermined extent before the carriage is re-adjusted, as will be hereinafter described.

In order that the front faces of all of the teeth may be ground to a given predetermined extent, a stop 56 is provided against which a portion of a non-working face 58 of each tooth is brought manually by clockwise rotation of the cutter, as viewed in Fig. 3, as each face of the cutter is ground. The stop 56 is mounted on a vertical stop post 60 which is shouldered and secured in an upright position to the carriage 14 by means of a nut 62. The cutter is sharpened in the usual manner by lifting it, revolving it until a new non-working face 58 is nearly in contact with the stop 56, at the same time sliding the cutter up and down upon its spindle and advancing it clockwise (Fig. 3) until the face 58 is in complete contact with the stop 56, when the front face of that tooth will have become sharpened to a predetermined extent. It will be noted that, because the stop post 60 is mounted on the carriage 14, it and its stop 56 are moved with the cutter spindle 12 when the carriage 14 is adjusted, by means of the knob 54 and its connecting mechanism, so there is no relative movement between the cutter spindle 12 and stop 56 as the carriage is adjusted.

In order to prevent the cutter from being slid down the cutter spindle below the horizontal center line of the grinding wheel, with the consequent danger of nicking the cutter and injuring the grinding wheel, a conveniently operated stop nut 64 is threaded on the cutter spindle 12. In order that the stop nut 64 may remain in adjusted position during the grinding of a cutter or set of cutters, the threaded portion of the cutter spindle is grooved longitudinally with one or more grooves 66 and a spring pressed ball 68 is located in the thumb nut 64, being retained therein by a set screw 70. This ball fits in the groove with sufficient tightness to prevent accidental rotation of the nut 64 but it offers no objectionable resistance to turning the nut into a new adjusted position.

Having thus described my invention, what I claim as new and desire to secure by Letters Patent of the United States is:

1. A machine for grinding the front faces of the teeth of a rotary toothed cutter in which the peripheral clearance faces are arcuate, having, in combination, a grinding wheel, a carriage mounted to turn about an axis, and a cutter spindle mounted on the carriage eccentric to said axis and parallel thereto and positioned to bring the center of curvature of the arcuate peripheral clearance face of a tooth of a cutter on the spindle in substantial coincidence with said axis when the front face of that tooth is in grinding position.

2. A machine for grinding the front faces of the teeth of a rotary toothed cutter in which the peripheral clearance faces are arcuate, having in combination, a grinding wheel, a carriage mounted to turn about an axis parallel to the grinding face of said wheel, and a cutter spindle mounted on the carriage eccentric to said axis and parallel thereto and positioned to bring the center of curvature of the arcuate peripheral clearance face of a tooth of a cutter on the spindle in substantial coincidence with said axis when the front face of that tooth is in grinding position.

3. A machine for grinding the front faces of the teeth of a rotary toothed cutter in which the peripheral clearance faces are arcuate, having, in combination, a grinding wheel, a carriage, a pivot pin for the carriage, and a cutter spindle mounted on the carriage eccentric to the pivot pin and parallel thereto and positioned to bring the center of curvature of the arcuate peripheral clearance face of a tooth of a cutter on the spindle in substantial coincidence with the axis of the pivot pin of the carriage when the front face of that tooth is in grinding position.

4. A machine for grinding the front faces of the teeth of a rotary toothed cutter in which the peripheral clearance faces are arcuate, having, in combination, a grinding wheel, a carriage mounted to turn about an axis, and a cutter spindle mounted on the carriage parallel to said axis and offset therefrom in a plane substantially perpendicular to the operating plane of the grinding wheel, and at such a distance from said axis as to bring the center of curvature of the arcuate peripheral clearance face of a tooth of a cutter on the cutter spindle in substantial coincidence with said axis when the front face of that tooth is in grinding position.

5. A machine for grinding the front faces of the teeth of a rotary toothed cutter in which the peripheral clearance faces are arcuate, having, in combination, a grinding wheel, a carriage mounted to turn about an axis, a cutter spindle mounted on the carriage eccentric to said axis and parallel thereto and positioned, when the front face of any tooth of a cutter on the spindle is in grinding position, to bring the center of curvature of the arcuate peripheral clearance face of that tooth into substantial coincidence with said axis, and a stop also mounted on the carriage against which a portion of each tooth in succession is held to determine the grinding positions for the several teeth and permit each tooth in succession to be ground only to a predetermined extent for each adjusted position of the carriage.

6. A machine for grinding the front faces of the teeth of a rotary toothed cutter in which the peripheral clearance faces are arcuate, having, in combination, a grinding wheel, a carriage mounted to turn about an axis, a cutter spindle mounted on the carriage eccentric to said axis and parallel thereto and positioned, when the front face of any tooth of a cutter on the spindle is in grinding position, to bring the center of curvature of the arcuate peripheral clearance face of that tooth into substantial coincidence with said axis, micrometric means for adjusting the carriage about the axis, as the teeth are worn away, to feed a clearance face in its own arc toward the wheel for grinding the front face of that tooth, and a stop also mounted on the carriage against which a portion of each tooth in succession is held to determine the grinding positions for the several teeth and permit each tooth in succession to be ground only to a predetermined extent for each adjusted position of the carriage.

7. A machine for grinding the front face of the teeth of a rotary toothed cutter in which the peripheral clearance faces are arcuate, having, in combination, a grinding wheel, a carriage mounted to turn about an axis, a cutter spindle mounted on the carriage eccentric to said axis and parallel thereto and positioned, when the front face of any tooth of a cutter on the spindle is in grinding position, to bring the center of curvature of the arcuate peripheral clearance face of that tooth into substantial coincidence with said axis, a worm and worm gear mechanism for adjusting the carriage about the axis, and a stop also mounted on the carriage against which a portion of each tooth in succession is held to determine the grinding positions for the several teeth and permit each tooth in succession to be ground only to a predetermined extent for each adjusted position of the carriage.

8. A machine for grinding the teeth of a rotary cutter having in combination, a grinding wheel, a carriage mounted to turn about an axis, a cutter spindle mounted on the carriage, a supporting member for the carriage, co-operating bearing surfaces on the carriage and the supporting member, worm teeth in the bearing surface on the carriage, a longitudinally fixed worm mounted in said member to engage said teeth, and means by which the worm may be rotated to turn the carriage about its axis.

9. A machine for grinding the front faces of the teeth of a rotary toothed cutter in which the peripheral clearance faces are arcuate having, in combination, a grinding wheel, a carriage mounted to turn about an axis, a cutter spindle mounted on the carriage eccentric to said axis and parallel thereto and positioned, when the front face of any tooth of a cutter on the spindle is in grinding position, to bring the center of curvature of the arcuate peripheral clearance face of that tooth into substantial coincidence with said axis, said spindle being constructed and arranged to permit a cutter to turn and slide thereon while it is being ground, means to limit the turning to permit each tooth to be ground only to the same predetermined extent, a stop to limit the sliding of the cutter across the grinding wheel beyond an axial plane of the wheel perpendicular to the cutter spindle, and friction means on the stop to maintain it in adjusted position while permitting re-adjustment.

JOHN F. STANDISH.